(12) United States Patent
Bush

(10) Patent No.: US 12,373,176 B2
(45) Date of Patent: Jul. 29, 2025

(54) SYSTEM AND TECHNIQUES FOR GENERATING A REUSABLE PROCESS

(71) Applicant: Cerner Innovation, Inc., Kansas City, MO (US)

(72) Inventor: Aaron Matthew Bush, Nixa, MO (US)

(73) Assignee: CERNER INNOVATION, INC., Kansas City, MO (US)

( * ) Notice: Subject to any disclaimer, the term of this patent is extended or adjusted under 35 U.S.C. 154(b) by 0 days.

(21) Appl. No.: 18/229,979

(22) Filed: Aug. 3, 2023

(65) Prior Publication Data
US 2024/0311101 A1 Sep. 19, 2024

Related U.S. Application Data

(60) Provisional application No. 63/452,886, filed on Mar. 17, 2023.

(51) Int. Cl.
G06F 8/36 (2018.01)
G06F 8/10 (2018.01)

(52) U.S. Cl.
CPC . G06F 8/36 (2013.01); G06F 8/10 (2013.01)

(58) Field of Classification Search
CPC .................................. G06F 8/36; G06F 8/10
USPC .................................................. 717/105–140
See application file for complete search history.

(56) References Cited

U.S. PATENT DOCUMENTS

| | | | | |
|---|---|---|---|---|
| 5,729,748 A * | 3/1998 | Robbins | ................. | G06F 8/447 712/E9.082 |
| 6,427,228 B1 * | 7/2002 | Wigger | ................. | G06F 9/4488 707/999.203 |
| 7,631,004 B2 * | 12/2009 | Skibo | .................... | G06F 40/186 707/999.102 |
| 8,510,304 B1 * | 8/2013 | Briggs | .................... | G06F 16/22 707/742 |
| 8,671,124 B2 * | 3/2014 | Khader | ................... | G06F 21/57 713/176 |
| 8,924,269 B1 * | 12/2014 | Seubert | ................. | G06Q 40/00 705/35 |
| 9,424,333 B1 * | 8/2016 | Bisignani | .............. | G06F 3/0482 |
| 10,346,298 B2 * | 7/2019 | Lee | ..................... | G06F 12/0261 |

(Continued)

OTHER PUBLICATIONS

She et al, "An Automatic Front-End Code Generation Method Based on Data and Template Integration", ACM, pp. 463-467 (Year: 2024).*

(Continued)

*Primary Examiner* — Anil Khatri
(74) *Attorney, Agent, or Firm* — Kilpatrick Townsend & Stockton LLP

(57) ABSTRACT

In some aspects, a method can be performed by a processor of a computing device. The method includes generating a non-executable code template that includes code that defines a set of operations. Additionally, the method includes accessing data about a particular project. Further, the method includes determining a set of project variables that pertain to the particular project and determining a set of project logic that pertains to the particular project. Furthermore, the method includes generating an executable code by integrating the set of project variables and the set of project logic into the non-executable code template. Moreover, the method includes compiling the executable code and generating a result by executing the compiled executable code.

17 Claims, 8 Drawing Sheets

(56) References Cited

U.S. PATENT DOCUMENTS

| | | | |
|---|---|---|---|
| 10,489,126 B2 * | 11/2019 | Kumar | G06V 30/422 |
| 11,178,188 B1 * | 11/2021 | Wu | H04L 63/20 |
| 11,271,973 B1 * | 3/2022 | Ravi | H04L 41/22 |
| 11,893,037 B1 * | 2/2024 | Chidurala | G06F 16/254 |
| 11,960,864 B2 * | 4/2024 | Kaliyaperumal | G06V 30/413 |
| 12,056,474 B2 * | 8/2024 | Wittstock | G06F 16/972 |
| 2008/0046868 A1 | 2/2008 | Tsantilis | |
| 2008/0127040 A1 * | 5/2008 | Barcellona | G06F 8/10 717/101 |
| 2022/0300098 A1 | 9/2022 | Seering et al. | |

OTHER PUBLICATIONS

Zang et al, "Java JIT Testing with Template Extraction", ACM, pp. 1-23 (Year: 2024).*

Italiano et al, "Finding Missed Code Size Optimizations in Compilers using Large Language Models", ACM, pp. 1-11 (Year: 2025).*

Auslander et al, ",Fast, Effective Dynamic Compilation", ACM, pp. 1-11 (Year: 1996).*

Singh et al, "A Metadata Catalog Service for Data Intensive Applications", ACM, pp. 1-17 (Year: 2003).*

Maiden et al., "Exploiting Reusable Specifications Through Analogy", Communications of the ACM, vol. 35, No. 4, Apr. 1992, pp. 55-64.

International Application No. PCT/US2024/013016, International Search Report and the Written Opinion, Mailed on May 28, 2024, 12 pages.

* cited by examiner

SYSTEM AND TECHNIQUES FOR GENERATING A REUSABLE PROCESS

CROSS-REFERENCE TO RELATED APPLICATIONS

This application claims the benefit of the filing date of U.S. Provisional Patent Application No. 63/452,886, filed on Mar. 17, 2023, the disclosure of which is incorporated by reference herein in its entirety.

FIELD OF THE INVENTION

The present disclosure relates generally to generating a reusable process, and more specifically, but not by way of limitation, to transforming a set of unique processes into a single reusable process.

BACKGROUND

Traditionally, code reusability is not available for code used in non-generic or non-similar products. Such an inability to reuse code across the products may results in hundreds (or more) of processes generated by an entity, each with unique code. In other words, each process of the hundreds of unique processes includes a code base that is self-contained and separate from other code bases, as data and logic of the processes are distinct for one another. Further, each of these processes can include hundreds or thousands of lines of code that are individually written and tested.

Current methodologies for generating the products are complex and rely on large code bases. The large code bases use significant resources for both development and maintenance. Further, updating an individual product has no bearing on the code bases associated with the other products. Thus, every code base relying on a similar update has to execute a unique updating process, which further consumes resources.

The current methodologies may work for entities with smaller, simple sets of projects. Although the sets of projects are still complex to design and write, the logic is well known and proven out. For these smaller, simpler sets of projects, the repetitive coding and updates may be sufficient. However, as these sets of projects grow and become more complex with significant dependencies, the processing required to generate and maintain project code bases becomes a time and resource intensive task.

BRIEF SUMMARY

This disclosure describes a new computing system that is able to transform a set of unique processes into a single reusable process. Such a computing system reduces resource consumption when developing and deploying the set of unique processes through the single reusable process.

In an example, a method is performed by one or more processors. The method includes generating a non-executable code template that includes code that defines a set of operations. Additionally, the method includes accessing data about a particular project. Further, the method includes determining a set of project variables that pertain to the particular project and determining a set of project logic that pertains to the particular project. Furthermore, the method includes generating an executable code by integrating the set of project variables and the set of project logic into the non-executable code template. Moreover, the method includes compiling the executable code and generating a result by executing the compiled executable code.

In various aspects, a system is provided that includes one or more data processors and a non-transitory computer readable storage medium containing instructions that, when executed on the one or more data processors, cause the one or more data processors to perform operations. The operations include generating a non-executable code template that includes code that defines a set of operations. Additionally, the operations include accessing data about a particular project and determining a set of project variables that pertain to the particular project. Further, the operations include determining a set of project logic that pertains to the particular project. The operations also include generating an executable code by integrating the set of project variables and the set of project logic into the non-executable code template and compiling the executable code. Moreover, the operations include generating a result by executing the compiled executable code.

In various aspects, a computer-program product is provided that is tangibly embodied in a non-transitory machine-readable storage medium and that includes instructions that cause one or more data processors to perform operations. The operations include generating a non-executable code template that includes code that defines a set of operations. Additionally, the operations include accessing data about a particular project and determining a set of project variables that pertain to the particular project. Further, the operations include determining a set of project logic that pertains to the particular project. The operations also include generating an executable code by integrating the set of project variables and the set of project logic into the non-executable code template and compiling the executable code. Moreover, the operations include generating a result by executing the compiled executable code.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
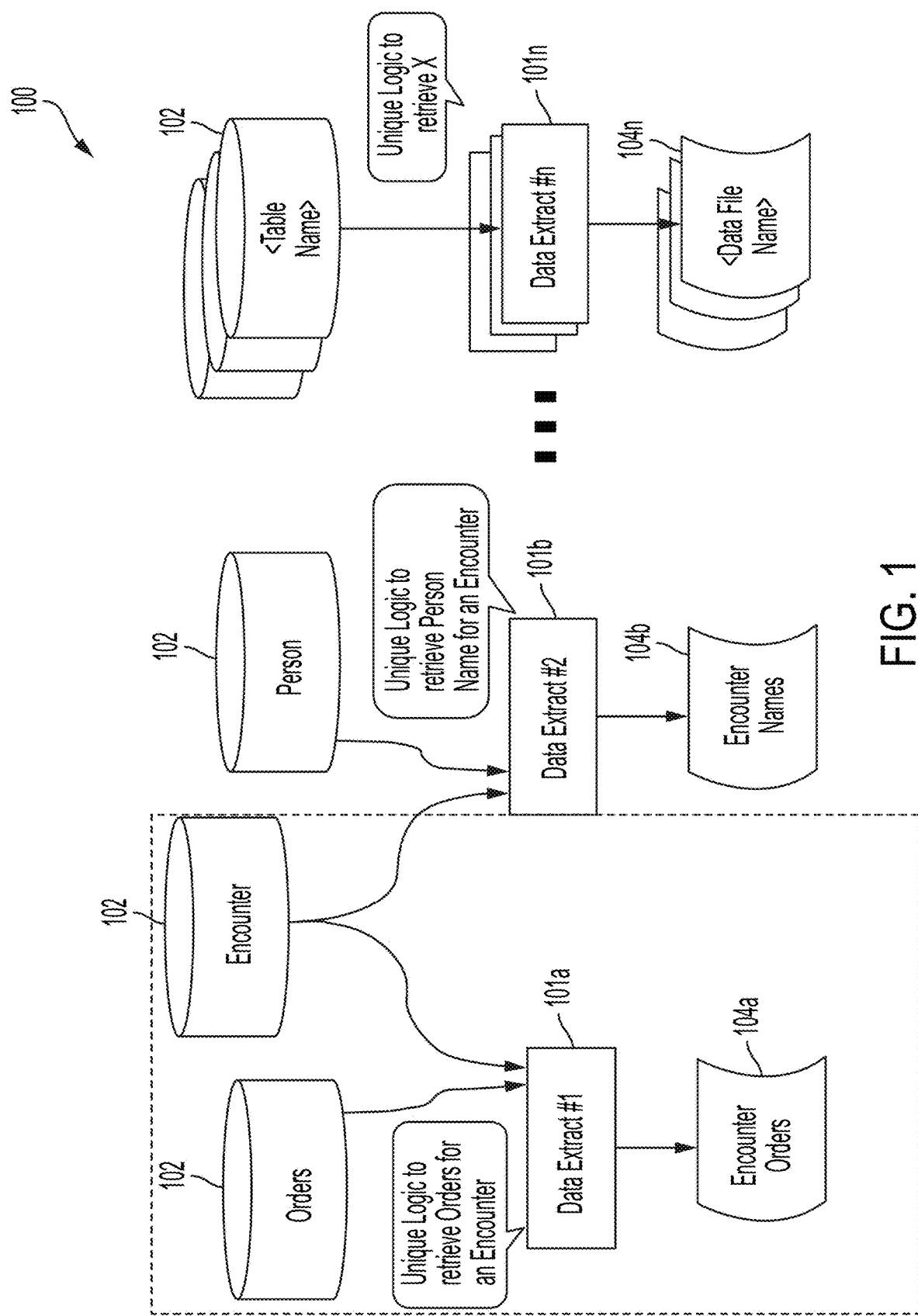
FIG. 1 is a simplified block diagram of an exemplary set of projects according to certain aspects.

In the following description, for the purposes of explanation, specific details are set forth in order to provide a thorough understanding of certain aspects. However, it will be apparent that various aspects may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other aspects or designs.

This disclosure describes a new computing system that enables transformation of a set of unique processes into a single reusable process. Such a computing system reduces resource consumption when developing and deploying the set of unique processes through the single reusable process. For example, this technique can drastically simplify the code used to perform the set of unique processes by reusing logic from potentially hundreds or thousands of lines of code in a unique manner. These techniques make generating and implementing code for the processes much faster, less error prone, and of higher quality, as all areas can now follow a single, proven method with a single reusable process. Accordingly, the presently disclosed subject matter can reap significant time and resource savings as compared to current methodologies in use today.

The computing system may include processes that generate a non-executable code template that includes code that defines a set of operations. The set of operations may include operations used to perform projects, such as a data extract, that an executable code generated subsequently from the non-executable code template is able to generate. In an example, the non-executable code template may be a template generated to perform generic or repeatable processes or logic when populated by unique variables and logic of a particular project in a manner that makes the non-executable code executable. That is, the non-executable code template may provide a code structure that becomes executable when the unique variables and logic are integrated into the non-executable code template. The unique variables and logic may be variables and logic unique to the particular project and not used in any or all remaining projects associated with the set of operations. The computing system may also include processes that generate a variable metadata table that includes variable fields associated with the set of operations. The processes may also generate a logic metadata table that includes logic fields associated with the set of operations. The variables and the logic that populate the non-executable code template in a manner that makes the non-executable code template executable may be obtained from the variable metadata table and the logic metadata table. While the variable metadata table and the logic metadata table are described as tables for storing the variable and logic metadata, other storage systems are also available. For example, the table may include rows and columns in a two-dimensional space, but additional storage systems, such as a multi-dimensional storage system, may also be used to store the variable and logic metadata.

Further, the computing system may include processes that access data about a particular project that is performed by one or more operations of the set of operations in the non-executable code template. In an example, the particular project may be a particular data extract that a user would like performed. For example, the particular project may be to retrieve orders for a tracked encounter at a hospital. Based on the accessed data of the particular project, the processes executed by the computing system may include determining a set of variables from the variable metadata table and a set of logic from the logic metadata table that pertain to the particular project. As used herein, the term "variable" may include data that identifies a particular value. For example, a variable may represent an individual identity, an action taken by an individual, or any other data that may change based on defined conditions. The term "variable name" may represent an identifier for what the variable represents, and the term "variable value" may represent the actual value of the variable at a particular instance. The term "logic" may represent any operation used in a project to access or manipulate data, such as variable values, to generate the project output.

Upon identifying the set of variables and the set of logic that pertain to the particular project, the computing system may execute processes to generate an executable code by integrating the set of variables and the set of logic into the non-executable code template. In other words, integration of the variables and the logic into the non-executable code template may generate code that is executable to perform the operation of the particular project. The processes executed by the computing system may then include compiling the executable code and generating a result by executing the compiled executable code. This process is repeatable for a number of different projects without the need to generate a new code base for each of the different projects. Accordingly, the computing system is able to efficiently reuse logic in the non-executable code template to generate executable code for the various projects by exchanging variables and logic that are integratable into the non-executable code template.

Compiling the executable code may be performed using a compiler, which is used to translate a programming language's source code into machine code. The non-executable code described herein may be portions of code that are not independently capable of being executed by the computing system. The executable code described herein, which may be generated by combining the non-executable code described herein, is capable of being executed by the computing system upon completion of a compiling operation by the compiler.

FIG. 1 is a simplified block diagram of an exemplary set of projects 100 according to certain aspects. The set of projects 100 can be defined by a series of operations 101*a*, 101*b*, . . . 101*n* that perform particular tasks using information obtained from a set of tables 102. The output of the series of operations 101*a*, 101*b*, . . . 101*n* may include data files 104*a*, 104*b*, . . . 104*n* generated using information extracted from multiple tables 102. For example, the operation 101*a* may be a data extract that includes unique logic used to retrieve orders from an orders table 102 associated with a particular encounter from an encounters table 102. The logic used to retrieve data from a table 102 may be unique in that a different logic may be used for each of the operations 101*a*, 101*b*, . . . 101*n*. A data extract, as used herein, may refer to an operation that collects or retrieves disparate types of information from a variety of sources, such as the tables 102.

In an example, the operations 101 may perform similar tasks. For example, all of the operations 101 may perform data extracts from one or more of the tables 102. The individual operations 101 may include unique logic to perform the particular data extract, but the structure of the unique logic may include a significant amount of reusable code. In such an example, the operations 101 may be defined by a set of both unique code associated with a particular operation 101 and a set of repeated code associated with all of the operations 101 of the set of projects 100. Accordingly, a reusable and non-executable code template, as discussed in further detail below, may be generated in a manner that enables integration of variables and logic associated with the operations 101 into the non-executable code. The resulting integration of the non-executable code template, the variables, and the logic may generate executable code that is capable of performing a particular operation 101 associated with a project of the set of projects 100.

Further, the set of projects 100 is generally described with respect to data extracts from the set of tables 102. The methodologies described in the present disclosure may be used for additional or alternative implementations. For example, the methodologies may be used to insert data into specific tables 102. If there are thousands of tables 102 that can receive data from a data insertion, there may be thousands of individual code projects that perform unique data insertions into those tables 102, as insertion logic for each of the tables may be unique due to the differences of the data and logic in the tables. The generic parts of the insertions may be pulled into a single code base, and the unique logic (i.e., variables and operations logic) for each table insert may be stored in one or more metadata tables. The unique logic may be called by the single code base to perform the unique insert of the data. Additionally, if, at some point in the future, an enhancement is discovered that more efficiently populates a portion of a generic table, a single code change can be made at the single code base to implement that change versus applying a code change to each of the thousands of individual code projects.

An additional example may include methodologies for deleting data from a specific table. If there are thousands of tables 102 that can be deleted from, there may be thousands of individual code projects that perform unique deletions from those tables 102, as deletion logic for each of the tables may be unique due to the uniqueness of the data and logic in the tables. The generic parts of the deletions may be pulled into a single code base, and the unique logic (i.e., variables and operations logic) for each table deletion may be stored in one or more metadata tables. The unique logic may be called by the single code base to perform the unique deletion of the data. Additionally, if at some point in the future, a defect is discovered in the code, a single code change can be made at the single code base to implement a correction versus applying a code change to each of the thousands of individual code projects.

The set of projects 100 is merely exemplary and other implementations can be much more complex. Further, while FIG. 1 is described with respect to extracts relating to data stored in the tables 102, as in a Structured Query Language (SQL) system, other languages and database storage systems may be implemented using similar techniques to those described herein. For example, the subject matter of the present disclosure may be applied to any code base that has multiple unique code projects that, at a very high level, perform the same overall functionality. Further, the code can be back-end code, front-end application code, cloud-based code, or any other types of code. Moreover, the set of projects 100, while depicted with respect to a clinical environment (e.g., orders and encounters), is not limited to use in healthcare or the healthcare management field.

Figure 2:
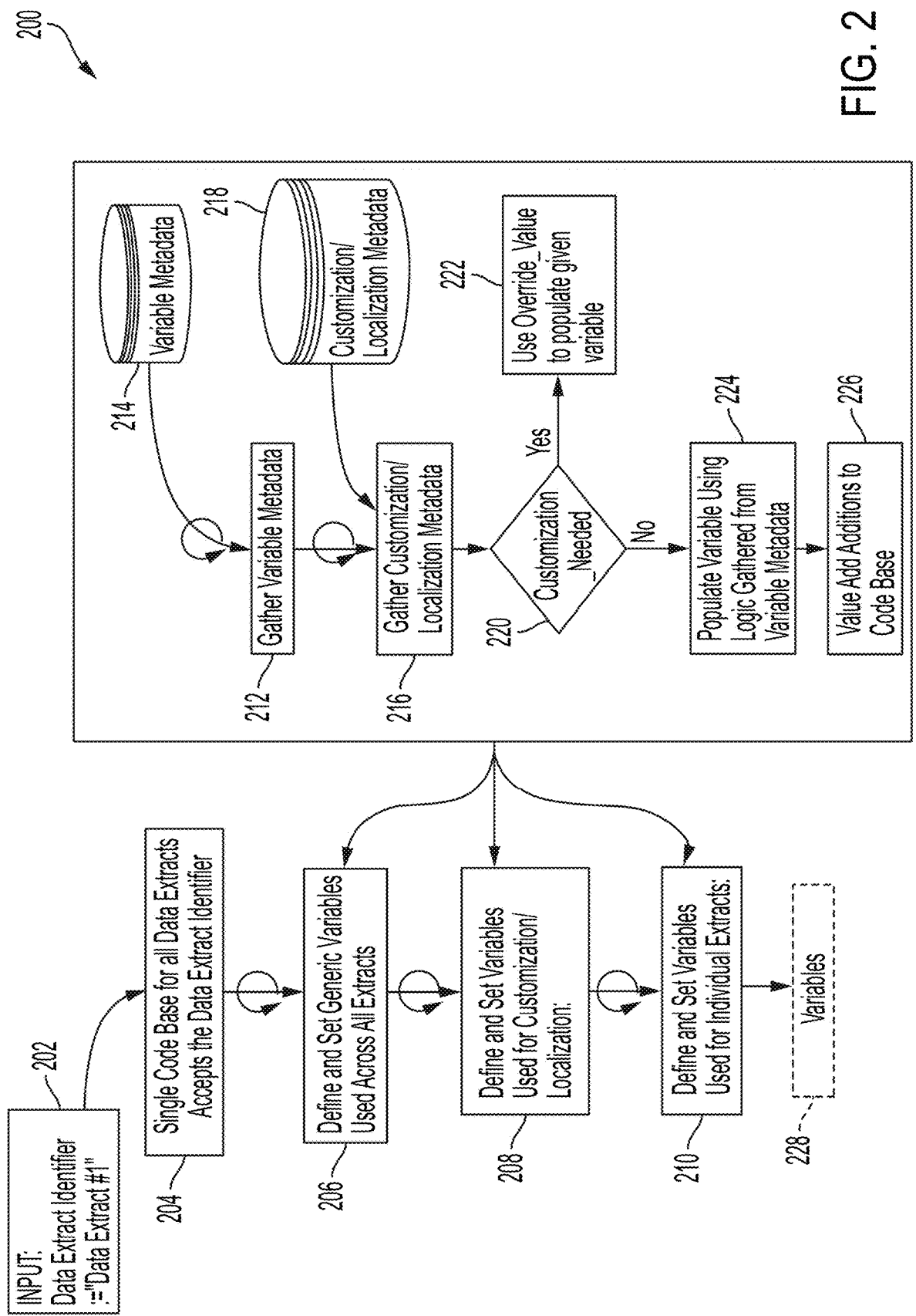
FIG. 2 is a simplified block diagram for a process for generating variable logic according to certain aspects.

FIG. 2 depicts simplified block diagrams for a process 200 for generating variable logic according to certain aspects.

The variable logic generated through the process 200 may be the unique aspects of a particular project. For example, the variable logic may identify the logic that separates one project from another project, where both projects share a single code base. The projects are described in FIG. 2 as data extracts, but the process 200 may be used for any code area where there are multiple unique code projects that, at a very high level, perform the same high-level functionality.

At block 202, the process 200 involves receiving an input that identifies a particular data extract. The particular data extract may be part of a project, and the process 200 may be tasked with generating the individual variable logic for that data extract. At block 204, the process 200 involves a single code base for a set of data extracts accepting the data extract identifier from block 202. The data extract identifier may be a unique string of text that identifies the particular data extract that may be part of the project. Examples of data extract identifiers for the projects 100 of FIG. 1 include "Encounter Orders," "Encounter Names," or other "<Data File Name>" identifiers.

Further, as discussed in detail below, blocks 206, 208, and 210 collectively describe use of a variable template code, which may define the generic and repeatable portions of variable logic. In an example, the variable template code may read the unique components of the variable metadata 214, and the reading of the variable metadata 214 by the variable template code may use unique logic pertaining to the variables defined and set at block 404 of the process 400 described below with respect to FIG. 4.

At block 206, the process 200 involves defining and setting generic variables used across all extracts of the set of extracts using the single code base. Defining and setting the generic variables may mean identifying variables that are used across the set of extracts. At subblock 212, to define the generic variables, the variable metadata 214 may be read by the variable template code, and the read data of the variable metadata 214 may be filtered for generic variables with the identification of the particular data extract used as an input. The filtered variable metadata is used to define and set values for all generic variables. That is, the filtered variable metadata is used to define and set the generic variables of the particular data extract that are also used for all projects of the single code base. In other words, template code for common, reusable variable logic may be used, and values returned by the metadata may be used to create and assign specific values for all variables. The variables can be static or dynamic, run-time variables. In an example, the dynamic variables may include additional logic that uses returned metadata to query needed values from specified tables either at compile time or at run time.

A specific example of a common, reusable variable logic may be a Select_SQL command, a From_SQL command, a Where_SQL command, or a combination thereof. These common, reusable variable logic commands may be used to build the variable template code. Examples of the metadata fields that are read can include data extract identifiers (e.g., unique text for a given data extract), variable names (e.g., unique text for a given variable), variable types (e.g., generic, customization, or extract specific), sequence order (e.g., an executable order in which the extracts are run), a command used to hold unique code used to identify fields being selected that will populate a given variable (e.g., Select_SQL), a command that holds unique code used to identify tables that will be used to populate a given variable (e.g., From_SQL), and a command that holds unique code used to apply logic to join tables and filter data that is used to populate a given variable (e.g., Where_SQL). Other metadata fields may be used, and the metadata fields may differ depending on the nature of the single code base being run (e.g., a data extract code base versus a table data deletion code base).

At block 208, the process 200 involves defining and setting variables used for customization and localization of the particular data extract. The customization and localization variables may be variables used to achieve particular project requirements that may differ from project to project. At subblock 216, to define the customization variables, the variable metadata 214 and customization and localization metadata 218 may be read, and the read data from the variable metadata 214 and the customization and localization metadata 218 may be filtered for customization variables associated with the identification of the particular data extract used as an input at block 202. The filtered variable metadata and the filtered customization and localization metadata are used to define and set values for all customization variables. That is, the filtered variable metadata is used to define and set the customization variables for the particular data extract, where the customization is different from other projects that also use the single code base. Additional logic may be added to read or use the customization and localization variables. In some examples, the variables can be dynamically defined at compile time versus execution time and may be populated upon metadata entry.

In an example, at subblock 220, a determination may be made regarding whether a customization criterion is satisfied or whether a user has provided instructions to perform customization for the variables of the particular data extract. If further customization is needed or desirable, then an override value may be used at subblock 222 to populate the variable of the particular extract. In an example, the override value may replace or otherwise alter the variables of the particular data extract. An example override value may include a variable assigned to capture a value used for a "Primary Nurse" variable. A specific client site may have a customized, nonstandard set-up used to define this specific variable. The set-up may not match the logic used across most client sites for this variable. In such an example, using the standard logic may return an incorrect value for this specific client site, and overriding the standard logic with custom logic or using a hardcoded override value may be desirable for the client. For example, if the standard logic returns a value of "123," but the correct value for the specific client site is "456," the client may either override the standard logic with a local, custom logic that would return the correct value of "456" or use an override value of "456." Another example might be a "Client Name" variable. In this example, there may not be standard logic used across clients to populate the variable, and all clients may use a custom override value to set their name correctly for the variable.

If further customization is not needed, then at subblock 224, the variable is populated from the variable metadata 214. In such an example, the common, reusable variable template code set, using the variable metadata 214, builds an executable code component which when executed, populates all variables for this section. These variables could be either static, dynamic run-time, or dynamic compile-time variables. Static variables are set and stored discretely, whereas dynamic variables are populated via logic and populated during the variable execution phase (i.e., dynamic run-time variables) or during the compile phase (i.e., dynamic compile-time variables) described below. The executable code may be dynamically executed to generate results that are used to populate the customization and localization variable. Examples of template code include the Select_SQL, From_SQL, and Where_SQL commands described above with respect to block 206.

At subblock 226, value-added additions to the variable template code are performed. For example, the variable data may be validated, and common, reusable template code can be tuned to be as performant as possible. Further, debugging logic may be added to the variable template code to enable easy debugging for the code. Other value add additions may also be included.

At block 210, the process 200 involves defining and setting variables used for individual extracts. To define the individual variables, the variable metadata 214 may be read, and the variable metadata 214 may be filtered for extract specific variables with the identification of the particular data extract used as an input. The filtered variable metadata is used to define and set values for all extract specific variables. That is, the filtered variable metadata is used to define and set the extract specific variables for the particular data extract that are unique from all projects of the single code base. A set of variables 228 for the particular data extract may be defined for generic variables, customization and localization variables, and individual extract variables. Further, the variables may be validated using null checks, sanity values, or other validation techniques.

While subblocks 212, 216, 220, 222, 224, and 226 are described above with specificity to block 208 of the process 200 to define and set variables used for customization and localization, the same or similar subblock operations 212, 216, 220, 222, 224, and 226 may also be used to define and set the generic variables at block 206 and to define and set the variables used for the individual extracts at block 210. Further, the subblocks 212, 216, 220, 222, 224, and 226 may be used to define and set other variables not described in the example of the process 200.

Figure 3:
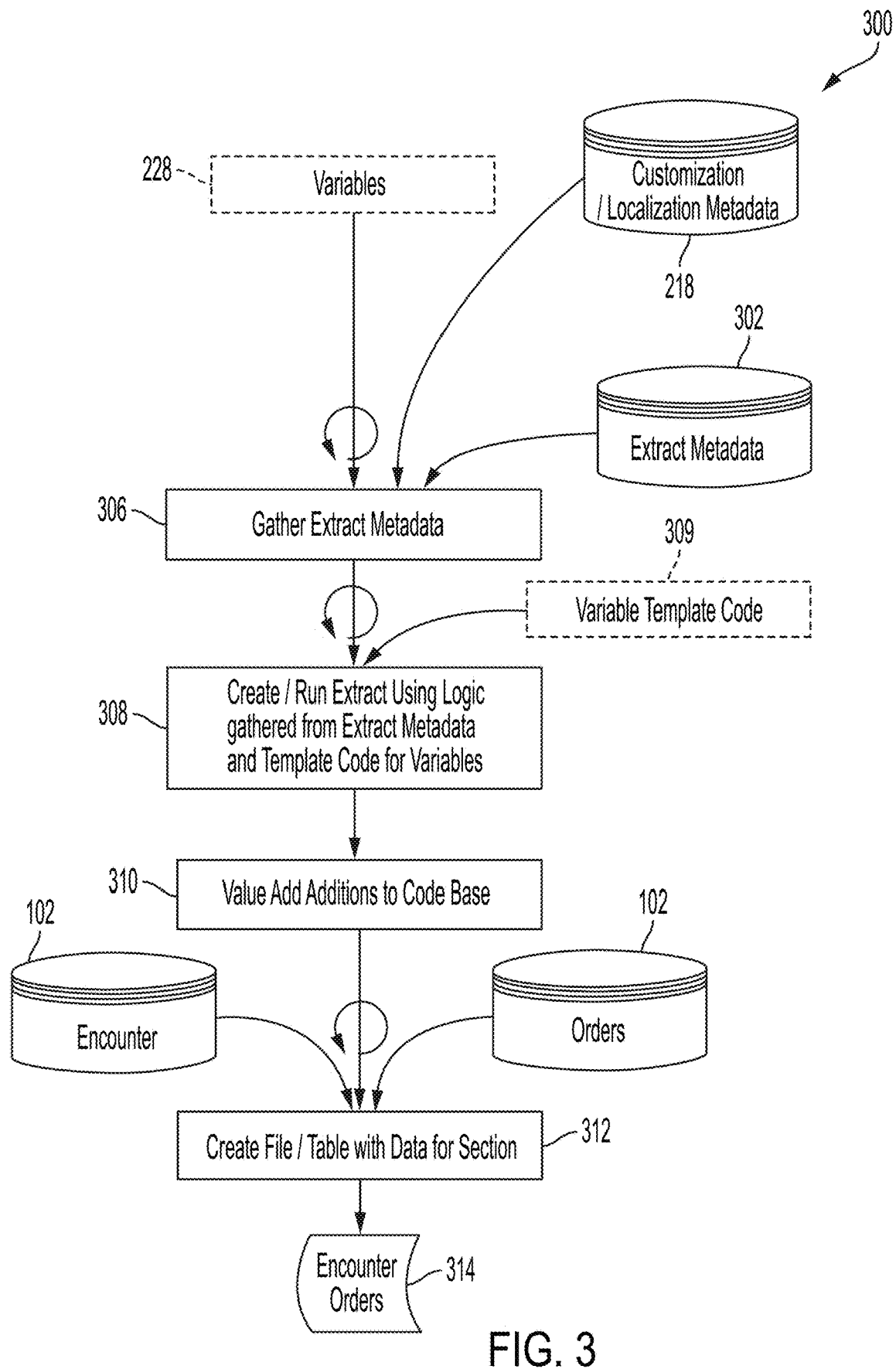
FIG. 3 is a simplified block diagram for a process for generating extract logic and outputting a result according to certain aspects.

FIG. 3 depicts a simplified block diagram for a process 300 for generating extract logic and outputting a result according to certain aspects. The extract logic may be generated using the customization and localization metadata 218, the variables 228 generated in the process 200, and extract metadata 302. At block 306, the process 300 involves dynamically gathering the extract metadata, and at block 308, the process 300 involves creating and executing the extract logic. Blocks 306 and 308 generally describe use of a logic template code, which may define the generic and repeatable portions of the extract logic. In an example, the logic template code may read unique components of the extract metadata 302 or other operations metadata, and the reading of the extract metadata 302 by the logic template code may use unique logic pertaining to the operations logic created at block 404 of the process 400 described below with respect to FIG. 4.

In an example, at block 306, the process 300 may involve reading the extract metadata 302 by the logic template code, filtered for the data extract identifier of block 202 defined in FIG. 2, and sorted by a section sequence order. The filtered extract metadata may be used to identify metadata used by a particular section of the extract logic. A template code for common, reusable extract logic, unique logic returned by the filtered metadata, and the variables 228 may be used to dynamically create executable extract logic to run a particular section of the data extract.

A specific example of a common, reusable extract logic may be a Select_SQL command, a From_SQL command, a Where_SQL command, or a combination thereof. These common, reusable extract logic commands may be used to build the logic template code. Fields that are read from the extract metadata 302 may include data extract identifiers (e.g., unique text for a given data extract), table name creators (e.g., unique text for a given table/file to be created), sequence order (e.g., an executable order in which the extracts are run), a command used to hold unique code used to identify fields being selected that will populate a given extract (e.g., Select_SQL), a command that holds unique code used to identify tables that will be used to populate a given extract (e.g., From_SQL), a command that holds unique code used to apply logic to join tables and filter data that is used to populate a given extract (e.g., Where_SQL), and Table/File definition (e.g., an output field order, data types, etc. used to define the table/file that is being created). Other metadata fields may be used, and the metadata fields may differ depending on the nature of the single code base being run (e.g., a data extract code base versus a table data deletion code base).

The extract logic can include table joins, table filters, fields to select (and order/data types of the fields), data transformation, general logic used across all extracts (e.g., data range filters, client identifiers, etc.), or any other logic used to perform a data extract. Dynamically compiled variables may be created upon variable metadata entry into to the executable extract logic. Further, additional logic may be added to read and use the customization and localization data (e.g., as obtain from the customization and localization metadata 218), as needed.

The unique extract logic may be stored within an extract metadata table. A specific example of the unique extract logic for a particular data extract may be "e.Encounter_ID, p.Person_Name" selected from a "Encounter e, Person p" where the "e.Person_ID=p.Person_ID and e. Update_DT_TM>=SYSDATE-1". In other words, the unique extract logic may define how the generic extract logic (e.g., Select_SQL, Where_SQL, Where_SQL) operates.

At block 308, the process 300 involves building the particular data extract as executable code using non-executable code logic gathered from the extract metadata 302 and a variable template code 309, which may be determined using the process 200 described above. For example, the non-executable code logic can be parsed to dynamically replace all variable positions within the non-executable code logic with the variables 228 generated by the process 200. Upon replacing the variable positions with the variables 228 to generate the executable code, the executable code may be compiled.

At block 310, the process 300 involves performing value-added additions to the logic template code. For example, the logic may be validated, and common, reusable template code can be tuned to be as performant as possible. Further, debugging logic may be added to the logic template code to enable easy debugging for the code. Other value add additions may also be included.

At block 312, the process 300 involves creating a file or table with data responsive to the particular data extract. For example, the process 300 may involve returning information from the tables 102 (e.g., an encounter table and an orders table) to generate a file or table 314 that stores the encounter orders, or other data, that is responsive to the particular data extract or other particular project. In an example, the file or table 314 may be presented to a user, transmitted to a user, used to control data storage operations, used to control execution of another application, or used to perform any other operations that are relevant to the information collected in the file or table 314.

Figure 4:
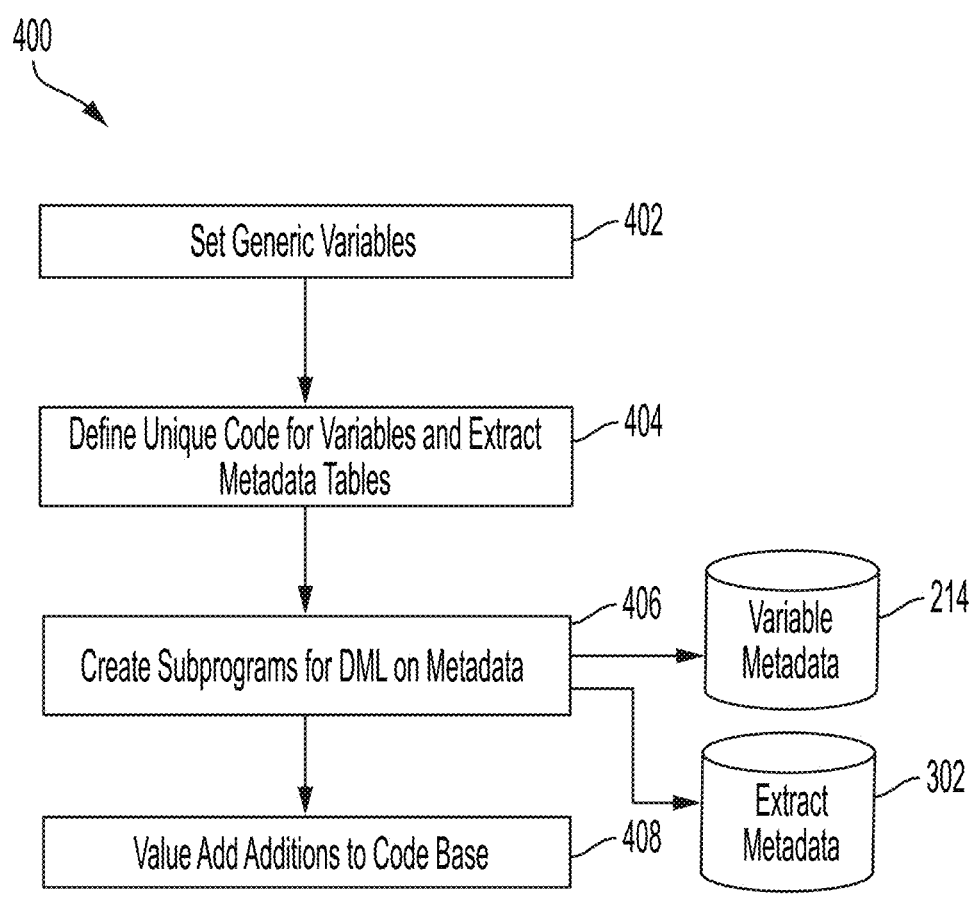
FIG. 4 illustrates a simplified block diagram for a process for performing metadata management according to certain aspects.

FIG. 4 illustrates a simplified block diagram for a process 400 for performing metadata management as part of the processes 200 and 300 described above with respect to FIGS. 2 and 3 according to certain aspects. In an example, metadata management may involve maintaining metadata (e.g., associated with variables and logic operations) that is used for the single reusable process. At block 402, the process 400 involves defining and setting generic metadata management variables. The generic metadata management variable defined and set at block 402 may generally be used across the metadata management process. These generic metadata management variables are different from the generic variables discussed above with respect to block 206 of the process 200.

At block 404, the process 400 involves defining unique code to populate variable metadata tables and extract metadata tables. This may include defining and setting all variables and extract logic that are unique for a given project, and defining the unique code to populate the variable metadata tables and extract metadata tables may repeat each time a new metadata row is populated for the tables. For example, the variables and extract logic unique for a given project may include core non-executable code that is stored on metadata tables. The unique code may be defined individually for each variable or logic section used in given project, and the unique code is defined one time on creation and modified as needed for maintenance (e.g., fixing bugs, adding enhancements, etc.). The individual portions of unique code may all be stored together in the metadata tables or other storage structures such that the individual portions are able to be called for insertion into the template code to generate executable code.

Additionally, the dynamic run-time variables may be defined for sections of code that require dynamic population at run-time of the data extracts. Dynamic compile-time variables may also be defined and populated with their values every time the metadata management process is executed, and the metadata tables may store these values. Storage of the dynamic compile-time variables and definitions of the dynamic run-time variables may enable setting of the variable values that are the same for a given implementation at metadata creation time while also dynamically updating the run-time values that may change per run of the code.

At block 406, the process 400 involves creating subprograms in Data Manipulation Language (DML) using the metadata. The subprograms may include template code that stores generic logic that is reusable across all metadata for inserting, updating, or deleting the metadata tables. The subprograms may use the generic logic, read in each of the variable and extract unique logic components created at block 404, and easily insert, update, or delete the various metadata tables. Unique inputs for each project or set of projects may be gathered as unique variables, in a fashion similar to the process 200 using the variable metadata 214. Additionally, all generic, repeatable variables may be defined and set for the set of projects, in a fashion similar to the process 200 using the variable metadata 214. Further, template code may be defined for common, reusable logic used for data manipulation of the metadata table, in a fashion similar to the process 300 using the extract metadata 302. The DML may be created and run as executable code using the unique inputs, the repeatable variables, and the template code, in a fashion similar to the process 300.

Creation of the subprograms at block 406 may be run as often as desired. For example, if two out of a large number of individual variable or extract unique logic components that are created or maintained at block 404 are modified, then all of the large number of individual variable or extract unique logic components may be executed with the subprograms at block 406 performing the work of scanning the code in block 404 and inserting, updating, or deleting the metadata as desired. In some examples, logic may be used to determine that all but the two individual variable or extract unique logic components have not been changed. Accordingly, those other individual variable or extract unique logic components may be skipped over, but all of the individual unique logic components may be checked. While two components are described as changing in this example, a change to any number of components may be implemented in a similar manner.

At block 408, the process 400 involves performing value-added additions to the executable code. For example, the DML executions may be validated, and common, reusable template code can be tuned to be as performant as possible. Further, debugging logic may be added to the code to enable easy debugging for the code. Other value add additions may also be included. Using the process 400, the variable and extract metadata tables, or other storage structures, may be updated, added to, and maintained in a manner that enables the processes 200 and 300 to easily access the metadata stored in the metadata tables for insertion of the metadata into code templates.

Figure 5:
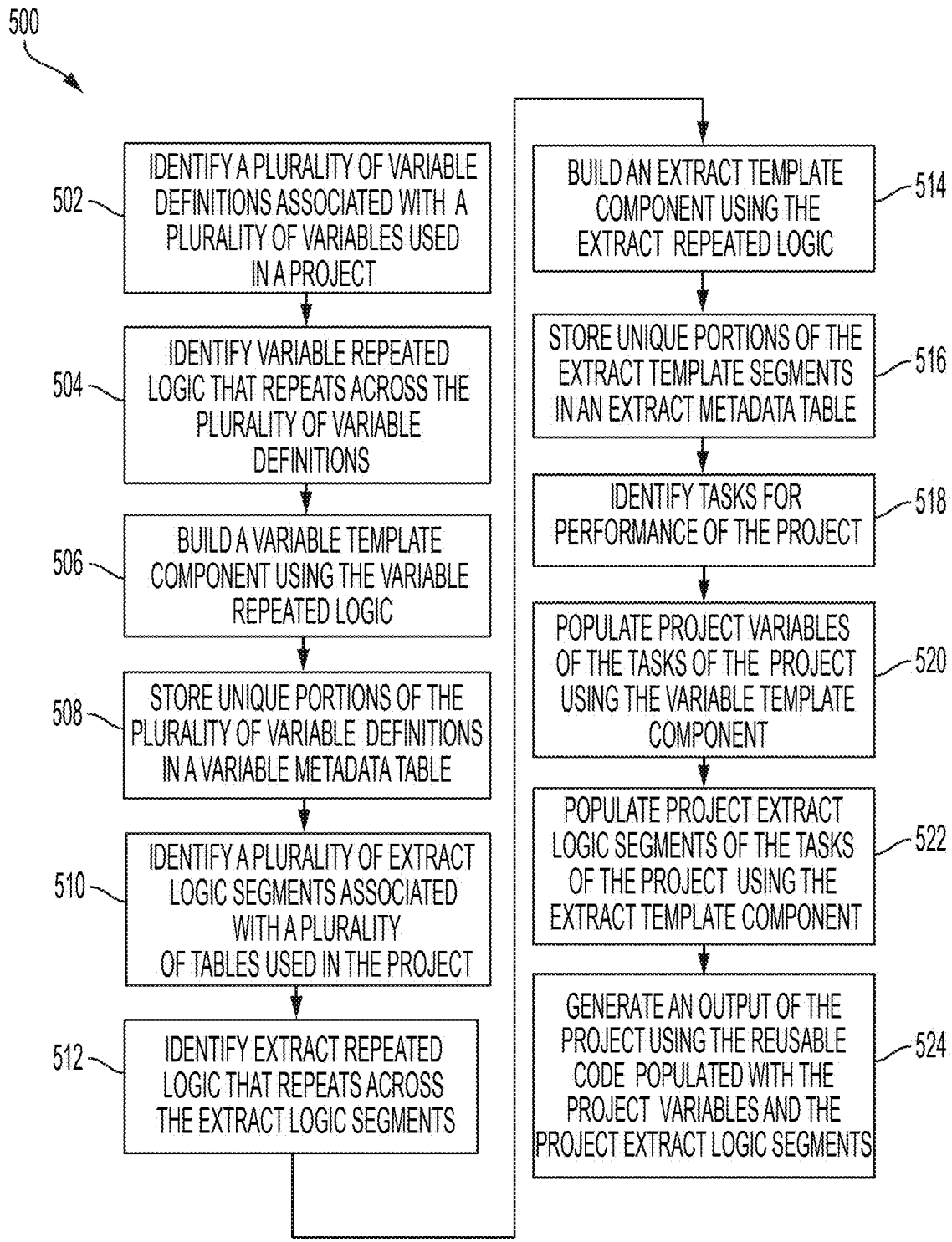
FIG. 5 illustrates a flowchart for a process for generating and implementing a single reusable process for performing a project according to certain aspects.

FIG. 5 illustrates a flowchart for a process 500 for generating and implementing a single reusable process for performing a project according to certain aspects. According to an example, one or more process blocks of FIG. 5 may be performed by a computing device.

It should be noted that while FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

At block 502, the process 500 involves identifying a plurality of variable definitions associated with a plurality of variables used in a project, such as a data extract. The variables used in a project may define values (e.g., obtainable from tables, databases, or other data sources) that can change across projects. The variable definitions may include logical structures for identifying locations of the variables within the data sources.

At block 504, the process 500 involves identifying repeated logic for the variables across the plurality of variable definitions, as described above with respect to block 224 of the process 200. The identified repeated logic may identify generic or dynamic variables used across all projects of the set of projects.

At block 506, the process 500 involves building a variable template code using the repeated logic for the variables, as described above with respect to block 224 of the process 200. The variable template code may be non-executable code, and the variable template code may be used as part of a single reusable code for the set of projects.

At block 508, the process 500 involves storing unique portions of the plurality of variable definitions in a variable metadata table. The variable metadata table may be defined in a manner that enables the variable template code to use the fields of the variable metadata table to recreate the variable definitions dynamically. Further, a single code base may be used to insert, update, and delete the unique portions of the plurality of variable definitions in the variable metadata table. The single code base may be used for initial data entry and ongoing data maintenance, and the single code base may be run whenever logic for any variable metadata is created, changed, or deleted. In an example, blocks 502 and 508 may be repeated for each new project added to the set of projects, and blocks 504, 506, and 508 may be validated for each of the new code projects to ensure that the process 500 continues to work for the new projects.

At block 510, the process 500 involves identifying a plurality of logic segments associated with a plurality of tables and files used in the project, as described above with respect to block 306 of the process 300. The logic segments may include code logic used to collect information from the plurality of tables and files.

At block 512, the process 500 involves identifying repeated logic that repeats across all of the logic segments of the set of projects, as described above with respect to block 308 of the process 300. The identified repeated logic may identify generic logic used across all projects of the set of projects.

At block 514, the process 500 involves building a logic template code using the repeated logic, as described above with respect to block 308 of the process 300. The logic template code may be non-executable code, and the logic template code may be used along with the variable template code as part of a single reusable code for the set of projects.

At block 516, the process 500 involves storing unique portions of the plurality of logic segments in a logic metadata table. The logic metadata table may be defined in a manner that enables the logic template code to use the fields of the logic metadata table to recreate the logic sections dynamically. Further, a single code base may be used to insert, update, and delete the unique portions of the plurality of logic segments in the logic metadata table. The single code base may be used for initial data entry and ongoing data maintenance, and the single code base may be run whenever logic for any logic metadata is created, changed, or deleted. In an example, blocks 510 and 516 may be repeated for each new project added to the set of projects, and blocks 512, 514, and 516 may be validated for each of the new code projects to ensure that the process 500 continues to work for the new projects.

Turning to blocks 518-524, the process 500 involves generation and execution of the executable code for a particular project. In some examples, blocks 518-524 may be executed every time the process runs to add data to the particular project (e.g., hourly, daily, etc.). At block 518, the process 500 involves identifying tasks for performance of the particular project. Identifying the tasks for performance enables identification of project variables and project logic segments for implementation with the single reusable code for the set of projects.

At block 520, the process 500 involves populating project variables of the tasks of the project using the variable template code. For example, the variable template code is able to use the variable metadata table to recreate the variable definitions used in the single reusable code dynamically.

At block 522, the process 500 involves populating logic segments of the tasks of the project using the logic template code. For example, the logic template code is able to use the logic metadata table to recreate the logic segments used in the single reusable code dynamically.

At block 524, the process 500 involves generating an output of the project using the single reusable code for the set of projects that is populated with the project variables and the project logic segment generated at blocks 520 and 522. The output may be stored in a table or a file. In some examples, the output is a particular data extract defined by the particular project. In some examples, a wrapper program can be created to enable running 1 to n unique data extracts at a given time using the variable metadata table, the logic metadata table, and the single reusable code.

While the processes 200, 300, 400, and 500 are described with respect to a clinical environment (e.g., orders and encounters), the processes 200, 300, 400, and 500 are not limited to use in healthcare or the healthcare management field. For example, these techniques can apply to other contexts, such as to processes that gather and process information from a variety of information sources.

Any code base that has multiple unique code projects that, at a very high level, perform the same overall functionality may implement the techniques described herein. For example, the methodologies may be used to insert data into specific tables 102. If there are thousands of tables 102 that can receive data from a data insertion, there may be thousands of individual code projects that perform unique data insertions into those tables 102, as insertion logic for each of the tables may be unique due to the differences of the data and logic in the tables. The generic portions of the insertions may be pulled into a single code base, and the unique logic (i.e., variables and operations logic) for each table insert may be stored in one or more metadata tables. The unique logic may be called by the single code base to perform the unique insert of the data. Additionally, if at some point in the future, an enhancement is discovered that more efficiently populates a portion of a generic table, a single code change can be made at the single code base to implement that change versus applying a code change to each of the thousands of individual code projects.

An additional example may include methodologies for deleting data from a specific table. If there are thousands of tables 102 that can be deleted from, there may be thousands of individual code projects that perform unique deletions from those tables 102, as deletion logic for each of the tables may be unique due to the uniqueness of the data and logic in the tables. The generic parts of the deletions may be pulled into a single code base, and the unique logic (i.e., variables and operations logic) for each table deletion may be stored in one or more metadata tables. The unique logic may be called by the single code base to perform the unique deletion of the data. Additionally, if at some point in the future, a defect is discovered in the code, a single code change can be made at the single code base to implement a correction versus applying a code change to each of the thousands of individual code projects.

The processes may also be applied to assembly lines in manufacturing processes, such as an automobile factory. The assembly lines may have common repeatable processes (e.g., inputting raw materials, having a robot perform a function n, validating the function n, repeating as desired, performing a final overall validation, and taking a completed part off of the assembly line). Additionally, the assembly lines may include unique portions to a given implementation. For example, portions of the repeatable processes may vary depending on whether the assembly line manufactures a truck or a compact car. Accordingly, the processes described herein may simplify the reusability of the repeatable processes of the assembly lines across the assemblies of multiple different products.

Further, the processes may include an application that collects data entries. There may be very common, repeatable processes involved with collecting the data entries (e.g., defining the area from which to collect data, defining the fields from which to collect, validation of the data, collection of the data, storage of the data, etc.). Additionally, collecting the data may also include sections that are very unique to a given implementation (e.g., collecting data for a phone book, versus collecting data for a customer, versus collecting data for sales opportunities, versus collecting data for a health care record, versus collecting data for sales orders, etc.). Each area may collect vastly different and unique data in different tables and fields, but the overall steps may be generic and repeatable at a high, abstract layer. Accordingly, the processes described herein may simplify the reusability of the generic and repeatable logic of the data collection processes.

Figure 6:
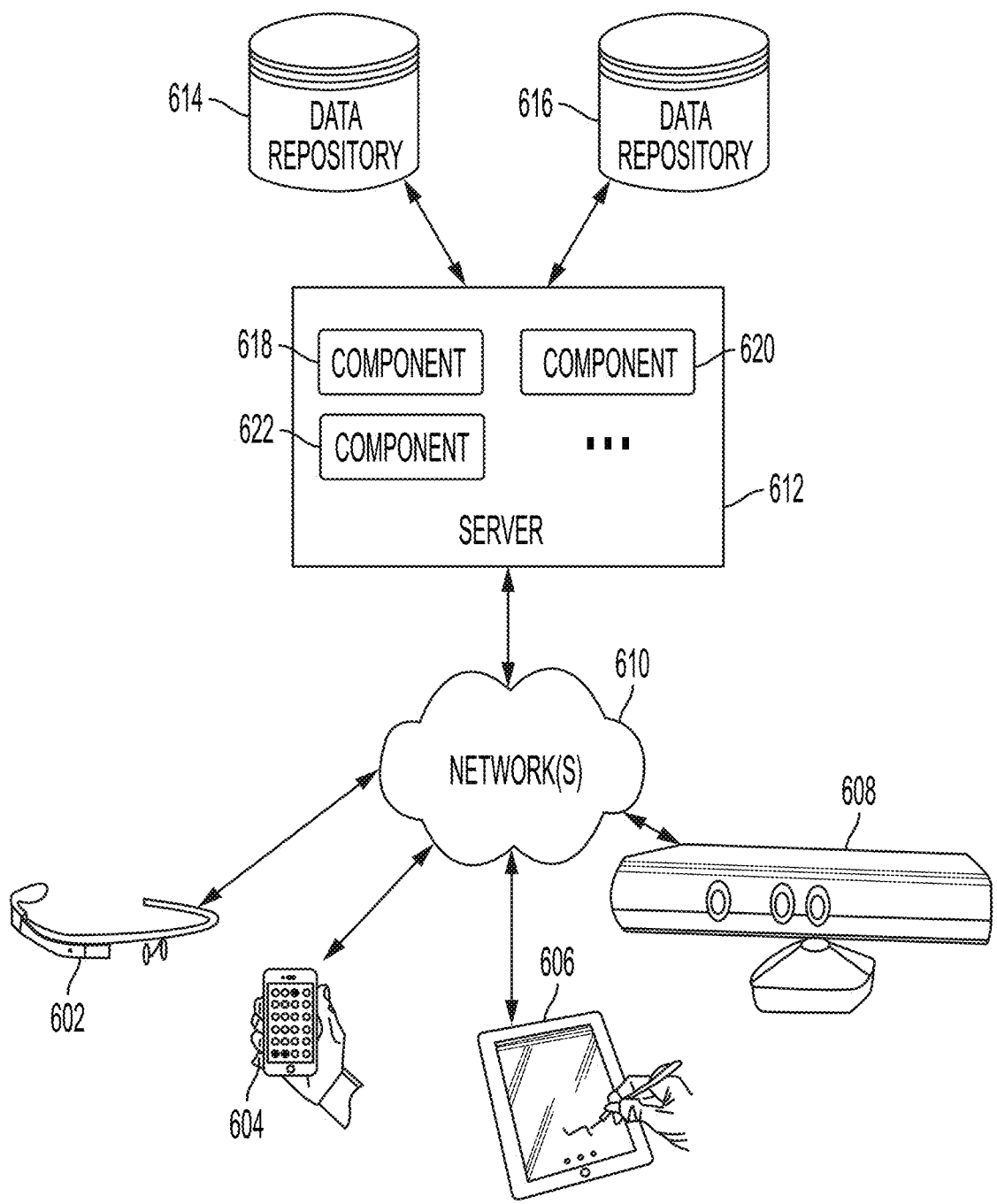
FIG. 6 depicts a simplified diagram of a distributed system for implementing certain aspects.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various aspects, server 612 may be adapted to run one or more services or software applications that enable techniques for handling long text for pre-trained language models.

In certain aspects, server 612 may also provide other services or software applications that can include non-virtual and virtual environments. In some aspects, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 for techniques for handling long text for pre-trained language models in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various aspects, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain aspects. For example, one or more of the data repositories 614, 616 may be used to store information for techniques for handling long text for pre-trained language models (e.g., intent score, overall score). Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain aspects, a data repository used by server 612 may be a database, for example, a relational database, such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 614, 616 may also be used by applications to store application data. The data repositories used by applications may be of different types such as, for example, a key-value store repository, an object store repository, or a general storage repository supported by a file system.

In certain aspects, the techniques for handling long text for pre-trained language models functionalities described in this disclosure may be offered as services via a cloud environment. FIG. 6 is a simplified block diagram of a cloud-based system environment in which various text handling-related services may be offered as cloud services, in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 612. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

Figure 7:
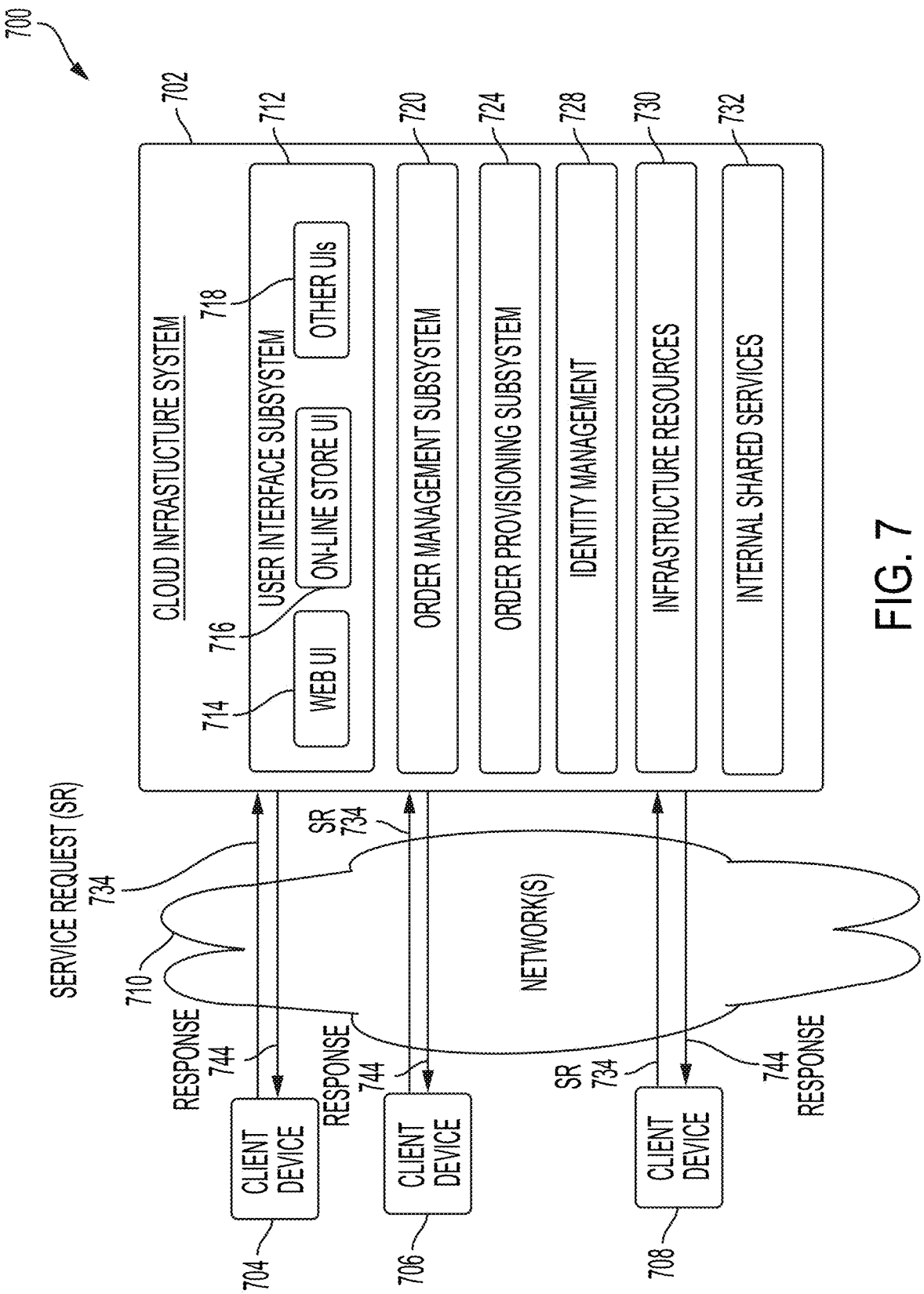
FIG. 7 is a simplified block diagram of one or more components of a system environment by which services provided by one or more components of an embodiment system may be offered as cloud services, in accordance with certain aspects.

The embodiment depicted in FIG. 7 is only one example of a cloud infrastructure system and is not intended to be limiting. It should be appreciated that, in some other aspects, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative aspects.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via a network 710 (e.g., the Internet), on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain aspects, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other aspects, under a private cloud model, cloud infrastructure system 702 may be operated within an organization (e.g., within an enterprise organization) and services provided to customers that are within the organization. For example, the customers may be various departments of an enterprise such as the Human Resources department, the payroll department, etc. or even individuals within the enterprise. In certain other aspects, under a community cloud model, the cloud infrastructure system 702 and the services provided may be shared by several organizations in a related community. Various other models such as hybrids of the above-mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request a chat bot service described in this disclosure.

In some aspects, the processing performed by cloud infrastructure system 702 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining the intent of an utterance. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain aspects, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a Chabot related service offered by cloud infrastructure system 702. As part of the order, the customer may provide information identifying for input (e.g., utterances).

In certain aspects, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain aspects, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
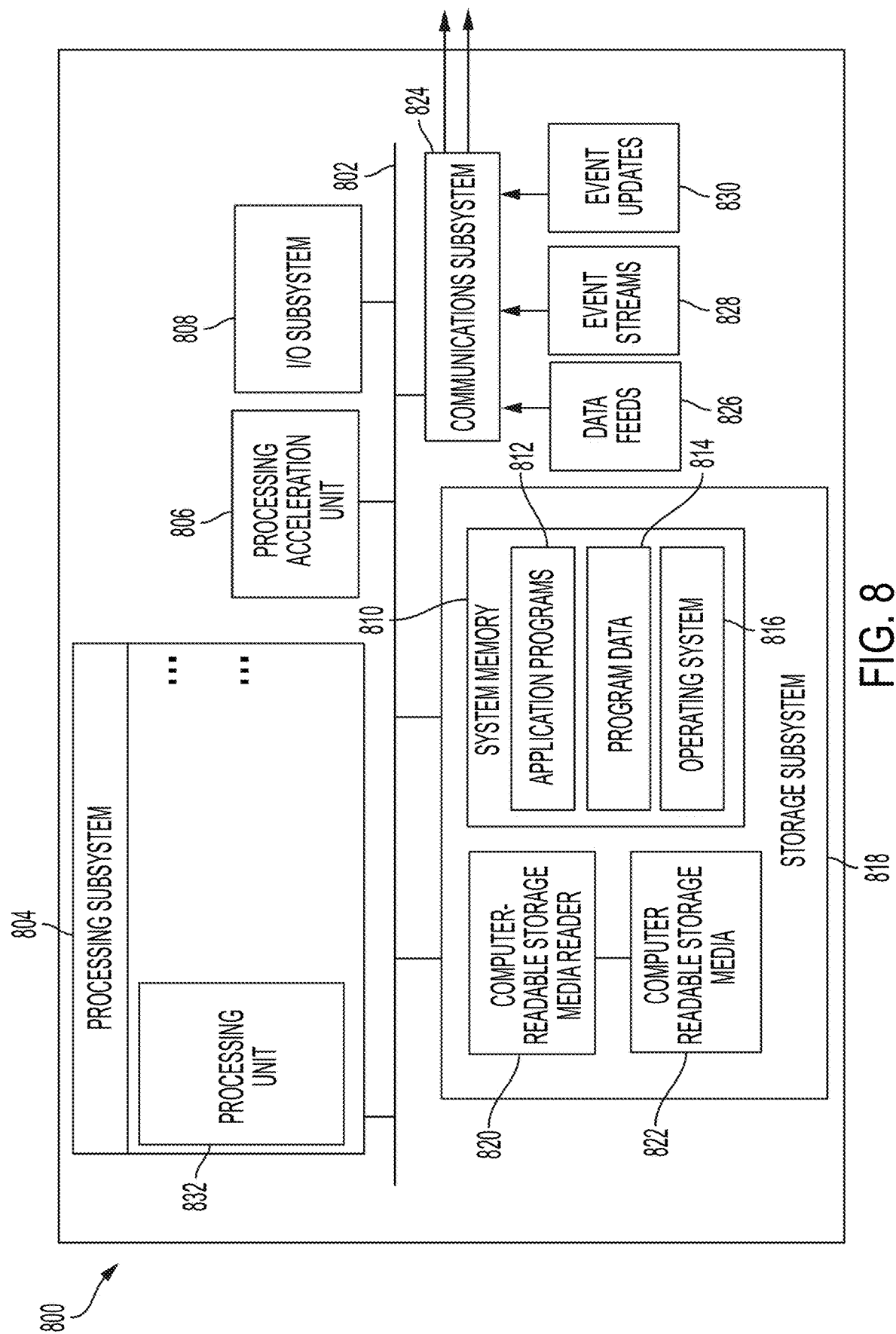
FIG. 8 illustrates an example computer system that may be used to implement certain aspects.

FIG. 8 illustrates an exemplary computer system 800 that may be used to implement certain aspects. For example, in some aspects, computer system 800 may be used to implement any of the system 400 for handling long text for pre-trained language models as shown in FIG. 4, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative aspects of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some aspects, processing subsystem 804 can include one or more special purpose co-processors such as graphics processors, digital signal processors (DSPs), or the like. In some aspects, some or all of the processing units of processing subsystem 804 can be implemented using customized circuits, such as application specific integrated circuits (ASICs), or field programmable gate arrays (FPGAs).

In some aspects, the processing units in processing subsystem 804 can execute instructions stored in system memory 810 or on computer readable storage media 822. In various aspects, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain aspects, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some aspects. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some aspects. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, digital video disc (DVD), a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 818 may also include a computer-readable storage media reader 820 that can further be connected to computer-readable storage media 822. Reader 820 may receive and be configured to read data from a memory device such as a disk, a flash drive, etc.

In certain aspects, computer system 800 may support virtualization technologies, including but not limited to virtualization of processing and memory resources. For example, computer system 800 may provide support for executing one or more virtual machines. In certain aspects, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to transmit a response to a user regarding the inquiry for a Chabot.

Communication subsystem 824 may support both wired and/or wireless communication protocols. For example, in certain aspects, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 824 can provide wired network connectivity (e.g., Ethernet) in addition to or instead of a wireless interface.

Communication subsystem 824 can receive and transmit data in various forms. For example, in some aspects, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook& updates, web feeds such as Rich Site Summary (RSS) feeds, and/or real-time updates from one or more third party information sources.

In certain aspects, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects will provide those skilled in the art with an enabling description for implementing various aspects. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method performed by one or more processors, the method comprising:
    generating a non-executable code template that includes reusable code that defines a set of operations;
    accessing data about a particular project;
    determining a set of project variables that pertain to the particular project;
    determining a set of project logic that pertains to the particular project;
    generating an executable code by integrating the set of project variables and the set of project logic into the non-executable code template;
    compiling the executable code;
    generating a result by executing the compiled executable code; and
    storing the result to a file or a table,
    wherein:
        the method further comprises generating a wrapper program to execute the particular project and a plurality of additional projects of the set of operations simultaneously,
        the generating the result further comprises generating the result of the particular project and a plurality of additional results of the plurality of additional projects simultaneously, and
        the plurality of additional results of the plurality of additional projects are attained by using the reusable code populated with project variables and project logic respectively corresponding to each of the plurality of additional projects.

2. The method of claim 1, further comprising:
    identifying a set of operations variables pertaining to the set of operations, wherein the set of operations variables comprises the set of project variables;
    for each operations variable of the set of operations variables, identifying unique variable logic that determines a value of the operations variable; and
    generating a variable metadata table comprising a set of variable fields associated with the unique variable logic of each operations variable of the set of operations variables,
    wherein the set of project variables that pertains to the particular project is accessed using the variable metadata table.

3. The method of claim 2, further comprising:
    identifying a set of operations logic pertaining to the set of operations, wherein the set of operations logic comprises the set of project logic;
    for each operations logic action of the set of operations logic, identifying unique project logic that determines a value of the operations logic action; and
    generating a logic metadata table comprising a set of variable fields associated with the unique project logic of each operations logic action of the set of operations logic,
    wherein the set of project logic that pertains to the particular project is accessed using the logic metadata table.

4. The method of claim 1, further comprising:
    defining unique code to populate a set of variable metadata tables and a set of extract metadata tables with variable metadata and extract metadata; and
    creating subprograms of the unique code that inserts, updates, or deletes the variable metadata of the variable metadata tables and the extract metadata of the extract metadata tables.

5. The method of claim 1, wherein the particular project comprises an extract from at least two clinical tables associated with an entity.

6. The method of claim 1, wherein at least a portion of the set of project variables comprises a set of dynamic values,
    wherein the set of dynamic values is accessed upon compiling the executable code or upon executing the executable code.

7. A system comprising:
    one or more processors; and
    a memory coupled to the one or more processors, the memory storing a plurality of instructions that, when executed by the one or more processors, cause the one or more processors to perform operations including:
        generating a non-executable code template that includes reusable code that defines a set of operations;
        accessing data about a particular project;
        determining a set of project variables that pertain to the particular project;
        determining a set of project logic that pertains to the particular project;
        generating an executable code by integrating the set of project variables and the set of project logic into the non-executable code template;
        compiling the executable code;
        generating a result by executing the compiled executable code; and
        storing the result to a file or a table, wherein:
the operations further include generating a wrapper program to execute the particular project and a plurality of additional projects of the set of operations simultaneously, the generating the result further includes generating the result of the particular project and a plurality of additional results of the plurality of additional projects simultaneously, and the plurality of additional results of the plurality of additional projects are attained by using the reusable code populated with project variables and project logic respectively corresponding to each of the plurality of additional projects.

8. The system of claim 7, wherein the operations further include:
identifying a set of operations variables pertaining to the set of operations, wherein the set of operations variables comprises the set of project variables;
for each operations variable of the set of operations variables, identifying unique variable logic that determines a value of the operations variable; and
generating a variable metadata table comprising a set of variable fields associated with the unique variable logic of each operations variable of the set of operations variables, wherein the set of project variables that pertains to the particular project is accessed using the variable metadata table.

9. The system of claim 8, wherein the operations further include:
identifying a set of operations logic pertaining to the set of operations, wherein the set of operations logic comprises the set of project logic;
for each operations logic action of the set of operations logic, identifying unique project logic that determines a value of the operations logic action; and
generating a logic metadata table comprising a set of variable fields associated with the unique project logic of each operations logic action of the set of operations logic, wherein the set of project logic that pertains to the particular project is accessed using the logic metadata table.

10. The system of claim 7, wherein the non-executable code template comprises a variable template code and a logic template code, wherein the variable template code comprises common variable logic applicable to all projects of the set of operations, and wherein the logic template code comprises common operations logic applicable to all projects of the set of operations.

11. The system of claim 7, wherein at least a portion of the set of project variables comprises a set of dynamic values,
wherein the set of dynamic values is accessed upon compiling the executable code or upon executing the executable code.

12. The system of claim 7, wherein the particular project comprises an extract from at least two clinical tables associated with an entity.

13. A non-transitory computer-readable medium storing a plurality of instructions that, when executed by one or more processors, cause the one or more processors to perform operations including:
generating a non-executable code template that includes reusable code that defines a set of operations;
accessing data about a particular project;
determining a set of project variables that pertain to the particular project;
determining a set of project logic that pertains to the particular project;
generating an executable code by integrating the set of project variables and the set of project logic into the non-executable code template;
compiling the executable code;
generating a result by executing the compiled executable code; and
storing the result to a file or a table,
wherein:
the operations further include generating a wrapper program to execute the particular project and a plurality of additional projects of the set of operations simultaneously, the generating the result further includes generating the result of the particular project and a plurality of additional results of the plurality of additional projects simultaneously, and the plurality of additional results of the plurality of additional projects are attained by using the reusable code populated with project variables and project logic respectively corresponding to each of the plurality of additional projects.

14. The non-transitory computer-readable medium of claim 13, wherein the operations further include:
identifying a set of operations variables pertaining to the set of operations, wherein the set of operations variables comprises the set of project variables;
for each operations variable of the set of operations variables, identifying unique variable logic that determines a value of the operations variable; and
generating a variable metadata table comprising a set of variable fields associated with the unique variable logic of each operations variable of the set of operations variables, wherein the set of project variables that pertains to the particular project is accessed using the variable metadata table.

15. The non-transitory computer-readable medium of claim 14, wherein the operations further include:
identifying a set of operations logic pertaining to the set of operations, wherein the set of operations logic comprises the set of project logic;
for each operations logic action of the set of operations logic, identifying unique project logic that determines a value of the operations logic action; and
generating a logic metadata table comprising a set of variable fields associated with the unique project logic of each operations logic action of the set of operations logic, wherein the set of project logic that pertains to the particular project is accessed using the logic metadata table.

16. The non-transitory computer-readable medium of claim 13, wherein the non-executable code template comprises a variable template code and a logic template code, wherein the variable template code comprises common variable logic applicable to all projects of the set of operations, and wherein the logic template code comprises common operations logic applicable to all projects of the set of operations.

17. The non-transitory computer-readable medium of claim 13, wherein at least a portion of the set of project variables comprises a set of dynamic values,
wherein the set of dynamic values is accessed upon compiling the executable code or upon executing the executable code.

* * * * *